(12) United States Patent  
Mutou

(10) Patent No.: US 9,407,314 B2
(45) Date of Patent: Aug. 2, 2016

(54) RADIO COMMUNICATION DEVICE AND METHOD FOR CONTROLLING RF-BB STATE IN THE SAME

(75) Inventor: Takashi Mutou, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 366 days.

(21) Appl. No.: 13/501,869

(22) PCT Filed: Oct. 13, 2010

(86) PCT No.: PCT/JP2010/006070
§ 371 (c)(1),
(2), (4) Date: Apr. 13, 2012

(87) PCT Pub. No.: WO2011/045922
PCT Pub. Date: Apr. 21, 2011

(65) Prior Publication Data
US 2012/0203943 A1    Aug. 9, 2012

(30) Foreign Application Priority Data
Oct. 14, 2009    (JP) ................... 2009-237060

(51) Int. Cl.
*H04B 1/40*    (2015.01)
*H04B 1/38*    (2015.01)
(Continued)

(52) U.S. Cl.
CPC .................. *H04B 1/401* (2013.01); *H04B 1/38* (2013.01); *H04B 1/40* (2013.01); *G06F 2213/0038* (2013.01)

(58) Field of Classification Search
CPC ................ H04B 1/38; H04B 1/40; H04J 3/24

USPC ......................................................... 710/105
See application file for complete search history.

(56) References Cited

U.S. PATENT DOCUMENTS 4,628,478 A * 12/1986 Henderson, Jr. .............. 710/305
7,702,281 B2    4/2010 Lindlar et al.
(Continued)

FOREIGN PATENT DOCUMENTS

CN    1538703 A    10/2004
CN    1640078 A    7/2005
(Continued)

OTHER PUBLICATIONS

Office Action dated Jan. 3, 2014, issued by the State Intellectual Property Office of the P.R.C. in corresponding Chinese Application No. 201080046860.9.
(Continued)

*Primary Examiner* — Tim T Vo
*Assistant Examiner* — Christopher A Daley

(57) ABSTRACT

A radio communication device enabling a serial interface to restart transmission in a short time when interface setting is changed, as well as a method for controlling RF-BB state in the device, are provided. According to the radio communication device in which a radio frequency section (20) and a baseband section (10) are connected through a serial interface, exclusive signals (Act, Act_Ack) for triggering an interface state change and for acknowledging it are provided between the radio frequency section and the baseband section, respectively. Interface state change control is performed by transmitting and receiving the interface state change trigger exclusive signal and its acknowledgement exclusive signal between the radio frequency section and the baseband section.

8 Claims, 4 Drawing Sheets

(51) Int. Cl.
*H04B 1/401* (2015.01)
*H04J 3/24* (2006.01)

(56) References Cited

U.S. PATENT DOCUMENTS

| | | | |
|---|---|---|---|
| 8,060,032 B2 | 11/2011 | Yamazaki | |
| 8,176,340 B2* | 5/2012 | Tripathi et al. | 713/300 |
| 8,254,365 B2* | 8/2012 | Storm et al. | 370/349 |
| 8,315,293 B2* | 11/2012 | Wenzel et al. | 375/219 |
| 8,363,767 B2* | 1/2013 | Wenzel et al. | 375/354 |
| 8,395,986 B2* | 3/2013 | Speth | 370/210 |
| 8,442,076 B1* | 5/2013 | Khlat | 370/520 |
| 8,473,000 B2* | 6/2013 | Kelleher et al. | 455/552.1 |
| 2006/0223455 A1 | 10/2006 | Kerth | |
| 2006/0239337 A1* | 10/2006 | Green et al. | 375/219 |
| 2007/0263570 A1* | 11/2007 | Alapuranen et al. | 370/337 |
| 2008/0095248 A1* | 4/2008 | Helfenstein | H04W 52/04 375/256 |
| 2008/0186146 A1 | 8/2008 | Tripathi et al. | |
| 2009/0068962 A1* | 3/2009 | Puehringer | G06F 13/4009 455/73 |
| 2009/0274207 A1 | 11/2009 | O'Keeffe et al. | |
| 2010/0074311 A1* | 3/2010 | Kopmeiners | 375/220 |
| 2010/0135275 A1* | 6/2010 | Storm et al. | 370/349 |
| 2010/0203919 A1* | 8/2010 | Kelleher et al. | 455/550.1 |
| 2011/0286547 A1* | 11/2011 | Reinhardt | H04B 1/40 375/295 |

FOREIGN PATENT DOCUMENTS

| | | | |
|---|---|---|---|
| CN | 101044467 A | 9/2007 | |
| DE | ep2202890 | * 12/2008 | H04B 1/00 |
| JP | 11-259408 A | 9/1999 | |
| JP | 2001-306343 A | 11/2001 | |
| JP | 2005-228222 A | 8/2005 | |
| JP | 2008-512907 A | 4/2008 | |
| WO | 03077481 A1 | 9/2003 | |
| WO | 2009019539 A1 | 2/2009 | |
| WO | 2009044438 A1 | 4/2009 | |

OTHER PUBLICATIONS

Communication dated Sep. 17, 2014, issued by the Japanese Patent Office in counterpart Japanese application No. 2011-536033.
Communication dated Dec. 12, 2014, issued by the European Patent Office in counterpart Application No. 10823190.3.

* cited by examiner

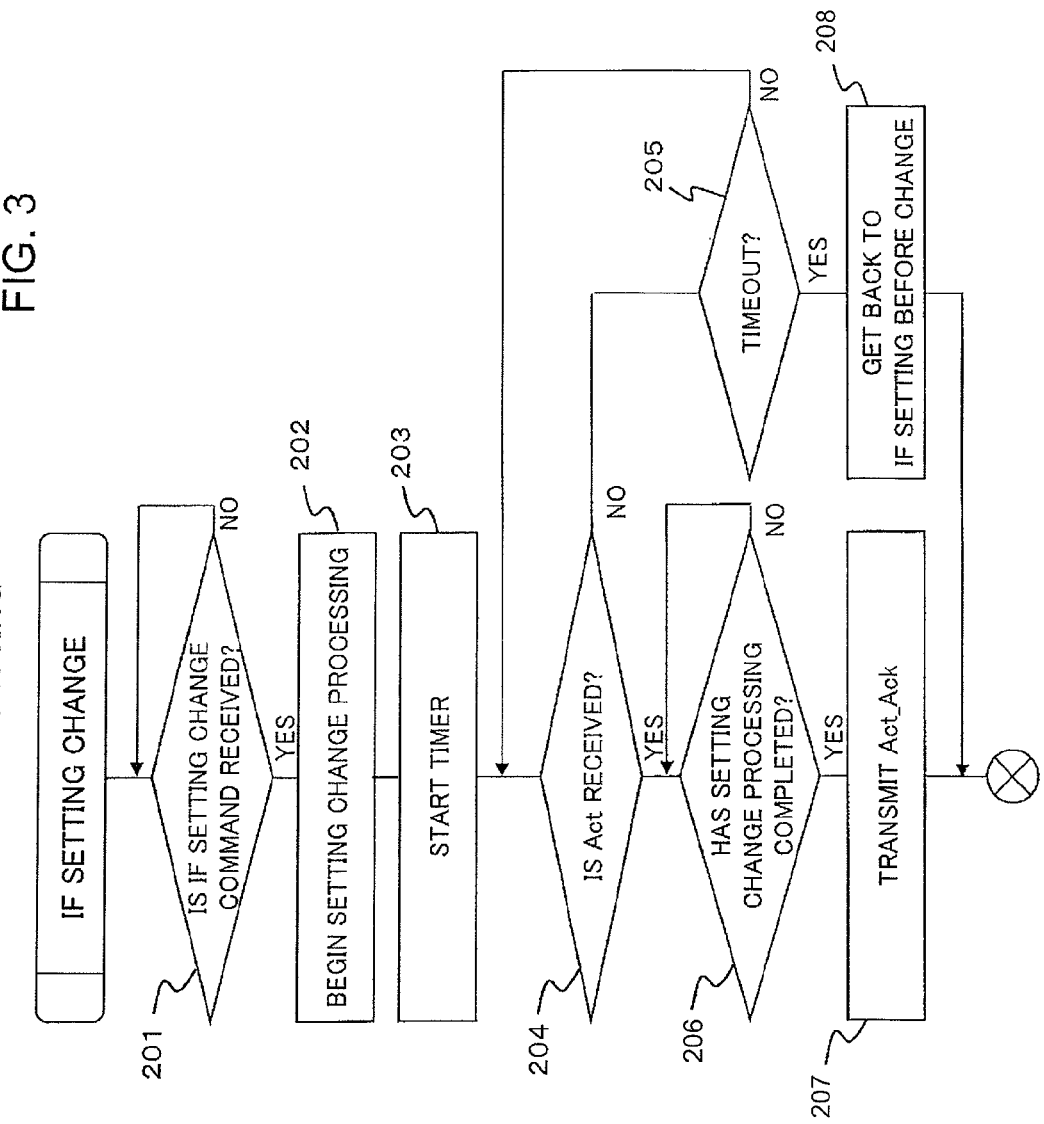

(EXAMPLE OF DigRF v4)

EXEMPLARY EMBODIMENT OF
THE PRESENT INVENTION

RADIO COMMUNICATION DEVICE AND METHOD FOR CONTROLLING RF-BB STATE IN THE SAME

CROSS REFERENCE TO RELATED APPLICATIONS

This application is a National Stage of International Application No. PCT/JP2010/006070 filed Oct. 13, 2010, claiming priority based on Japanese Patent Application No. 2009-237060 filed Oct. 14, 2009 the contents of all of which are incorporated herein by reference in their entirety.

TECHNICAL FIELD

The present invention relates to a radio communication device in which a radio frequency IC chip (hereinafter, referred to as RFIC) and a baseband IC chip (hereinafter, referred to as BBIC) are connected through a serial interface and, more particularly, to a method for controlling its RF-BB state.

BACKGROUND ART

In recent years, with improvements in radio system transmission capabilities, the amounts of information exchanged between RFIC and BBIC (hereinafter, abbreviated as RF-BB) also increase. Moreover, it is also required, for still smaller mobile telephone devices, to reduce the number of RF-BB connection terminals and, for power savings, to make transmission speed variable in accordance with a communication system in operation.

To meet these requirements, the MIPI (Mobile Industry Processor Interface) alliance adopts high-speed serial interfaces of variable transmission speed type as a RF-BB interface system and is developing specifications thereof. More specifically, according to DigRFv4 interface, BBIC serves as a master while RFIC serves as a slave in terms of control, and the DigRFv4 interface is provided with a serial interface for transmission of control commands and transmission data mainly from BBIC and a serial interface, activated as necessary by a control command from BBIC, for transmission of state notifications and reception data mainly from RFIC. In the specifications of DigRFv4, transmission speed, the number of data paths, and the like are changed by transmitting a command through the serial interface.

Note that, for general serial interfaces, known is a method of transferring data from a master device to a slave device, as disclosed in PTL1, for example. That is, upon start of serial transfer, a master transmits a write command to a slave and, waiting until the arrival of an acknowledgement from the slave, transmits data.
{PTL 1} Japanese Patent Application Unexamined Publication No. 2005-228222

SUMMARY

Technical Problem

As described above, according to DigRF v4, since a command is transmitted through a serial interface to change transmission speed, the number of data paths, and the like, a delay may occur due to a wait for serial transmissions. Such a delay should be prevented particularly when control with tight constraint of time such as transmission start and reception start performed over RFIC. For measures to reduce a delay, several functions have been defined: for example, a function of nesting commands, a function of double transmission of a single command in order to prevent retransmission of the command due to data error occurring along a transmission link, a function of timing matching using a retransmission identifier, and the like.

However, such functions require fast and complicated processing from both of RFIC and BBIC, making it hard to implement the functions. In addition, according to the method as in PTL 1 mentioned above in which processing is performed after waiting until the arrival of an acknowledgement in response to a command, it is difficult to eliminate the occurrence of a delay due to a wait for serial transmissions. Therefore, there is a problem that, for example, a change in setting of an interface cannot be started until a response from RFIC is received, increasing the time taken from the start of processing until the restart of communication (see FIG. 4B, which will be mentioned later).

An object of the present invention is to provide a radio communication device enabling a serial interface to restart transmission in a short time when setting of the interface is changed, as well as a method for controlling RF-BB state in the device.

Solution to Problem

A radio communication device according to the present invention is a radio communication device which comprises a radio frequency section and a baseband section which are connected through a serial interface, wherein a signal dedicated to an interface state change trigger and a signal dedicated to its acknowledgement are provided between the radio frequency section and the baseband section, and are used for interface state change control.

A state control method according to the present invention is a state control method for a radio communication device including a radio frequency section and a baseband section which are connected through a serial interface, wherein interface state change control is performed by transmitting and receiving a signal dedicated to an interface state change trigger and a signal dedicated to its acknowledgement between the radio frequency section and the baseband section.

Advantageous Effects of Invention

According to the present invention, it is possible that a serial interface restarts transmission in a short time when setting of the interface is changed.

BRIEF DESCRIPTION OF DRAWINGS

FIG. 3 is a flowchart showing operation of a radio frequency (RF) IC in the method for controlling RF-BB state according to the present exemplary embodiment.

DETAILED DESCRIPTION OF EXEMPLARY EMBODIMENTS

Hereinafter, a detailed description will be given of a system in which control of changing transmission speed, the number of transmission paths, and the like is performed by using a command over a serial interface, by showing DigRFv4 interface as an example of the serial interface between a radio frequency section and a baseband section in a radio communication device such as a mobile telephone terminal or mobile information communication equipment.

1. Configuration

Figure 1:
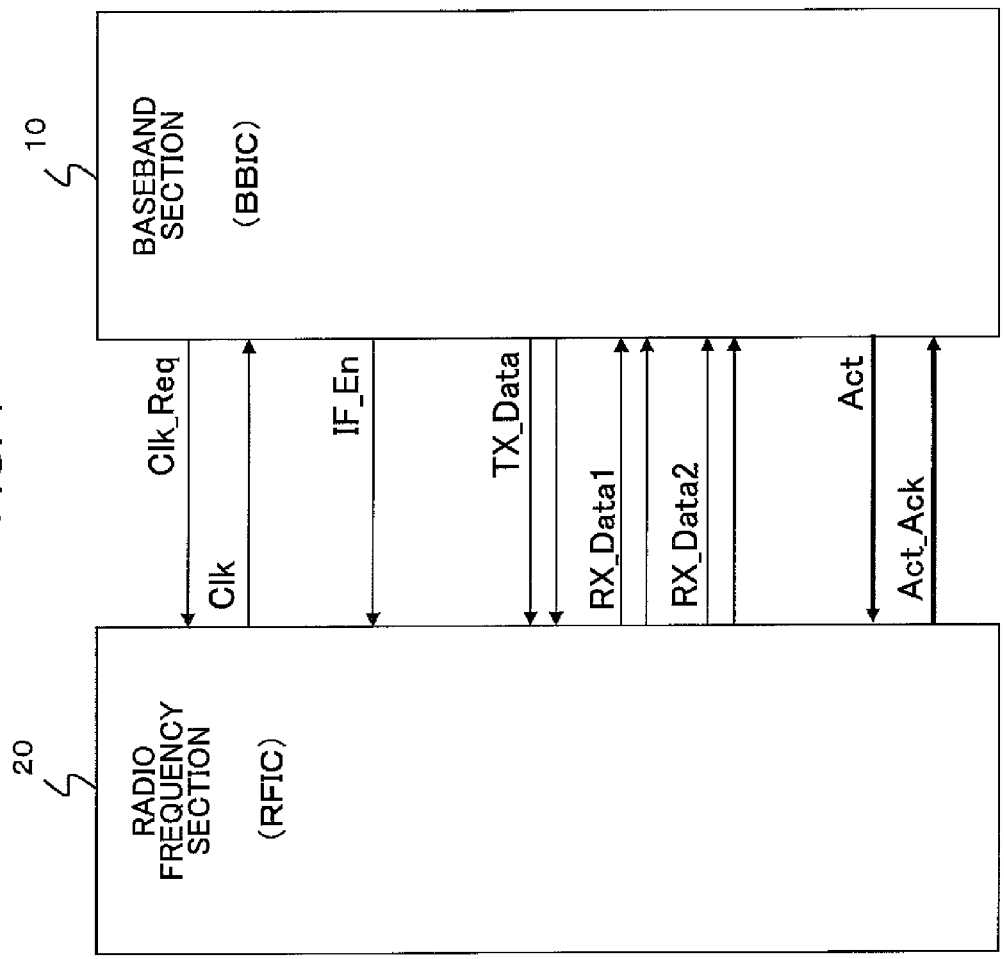
FIG. 1 is a schematic block diagram showing RF-BB interfaces in a radio communication device according to an exemplary embodiment of the present invention.

Referring to FIG. 1, a baseband section 10 of a radio communication device is composed of a baseband IC chip (hereinafter, referred to as BBIC), and a radio frequency section 20 thereof is composed of a radio frequency IC chip (hereinafter, referred to as RFIC). BBIC 10 serves as a master of control, and RFIC 20 serves as a slave of control.

BBIC 10 and RFIC 20 exchange interface signals as described below. That is, the interface signals include a clock request signal Clk_Req, a clock supply signal Clk, a serial interface activation signal IF_En, a serial interface TX_Data for transmitting control commands and transmission data mainly from BBIC 10, and serial interfaces RX_Data1 and RX_Data2 for transmitting state notifications and reception data mainly from RFIC 20. The serial interfaces RX_Data1 and RX_Data2 are activated as necessary by a control command from BBIC 10.

Moreover, the interface according to the present exemplary embodiment, in addition to these signals, further includes terminals dedicated to an interface state change trigger signal Act and its acknowledgment signal Act_Ack. Each of the state change trigger signal Act and acknowledgement signal Act_Ack is a dedicated signal with constant pulse widths independently of the transmission speeds of the serial interfaces TX_Data, RX_Data1, and RX_Data2. As will be described later, use of such dedicated signals makes it possible to perform RF-BB negotiation processing in parallel with PLL (Phase-Locked Loop) start processing when the speeds of the serial interfaces TX_Data, RX_Data1, and RX_Data2 are changed.

2. Operation

Hereinafter, a description will be given of transmission and reception of the interface signals of BBIC 10 when an IF setting change occurs. Here, specifically, "an IF setting change" is assumed to mean a change in the transmission speed of any of the serial interfaces TX_Data, RX_Data1, and RX_Data2, or activation of the serial interfaces RX_Data1 and RX_Data2.

Figure 2:
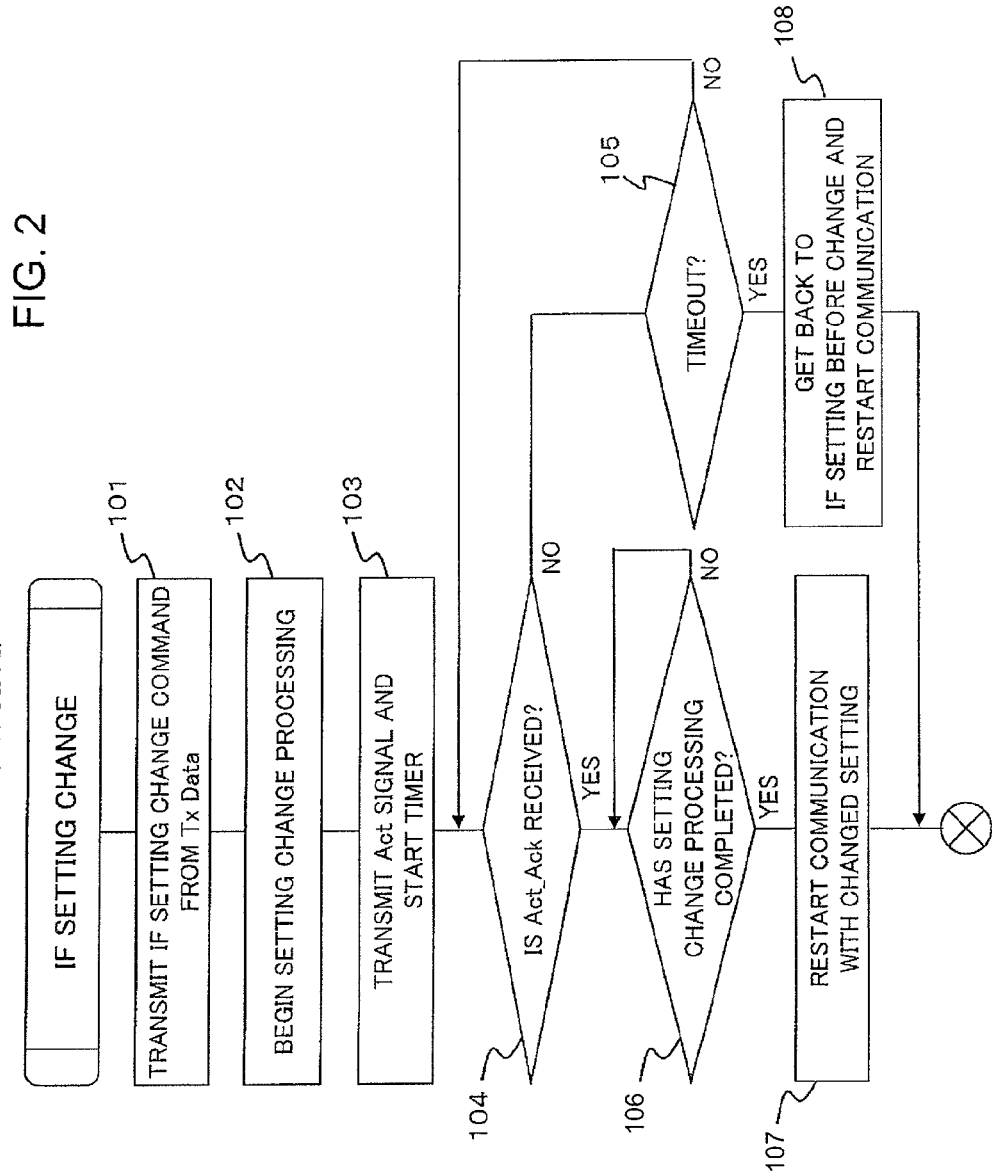
FIG. 2 is a flowchart showing operation of a baseband (BB) IC in a method for controlling RF-BB state according to the present exemplary embodiment.

Referring to FIG. 2, when commencing IF setting change processing, BBIC 10 first transmits a setting change command to RFIC 20 through the serial interface TX_Data (Step 101) and immediately thereafter begins internal processing such as PLL (Phase-Locked Loop) activation processing and data path activation (Step 102). Subsequently, BBIC 10 generates a state change trigger signal Act while starting an internal timer at the same time (Step 103) and then waits for an acknowledgement signal Act_Ack from RFIC 20 (Step 104).

If an acknowledgement signal Act_Ack is returned from RFIC 20 (Step 104: YES) before the internal timer times out (Step 105: NO), BBIC 10 regards it as the setting change command having been processed at RFIC 20 as expected and, waiting until the setting change within BBIC 10 has completed (Step 106: YES), restarts transmission through the serial interface with the changed setting (Step 107).

On the other hand, if an acknowledgement signal Act_Ack is not returned from RFIC 20 before the internal timer times out (Step 105: YES), BBIC 10, regarding it as RFIC 20 having not received the interface setting change command or as setting change processing having not completed due to an error inside RFIC 20, discards the serial interface setting change, gets back to the state before change, and then restarts transmission through the serial interface (Step 108).

Referring to FIG. 3, RFIC 20, upon receipt of the setting change command through the serial interface TX_Data (Step 201: YES), begins interface setting change processing (Step 202) and starts an internal timer (Step 203). If a state change trigger signal Act is received from BBIC 10 (Step 204: YES) before the internal timer times out (Step 205: NO), RFIC 20 waits until the internal setting change has completed (Step 206: YES) and then sends out an acknowledgement signal Act_Ack to BBIC 10 (Step 207). if a state change trigger signal Act is not received from BBIC 10 before the internal timer times out (Step 205: YES), RFIC 20 discards the serial interface setting change and performs processing for getting back to the state before change (Step 208).

Figure 4B:
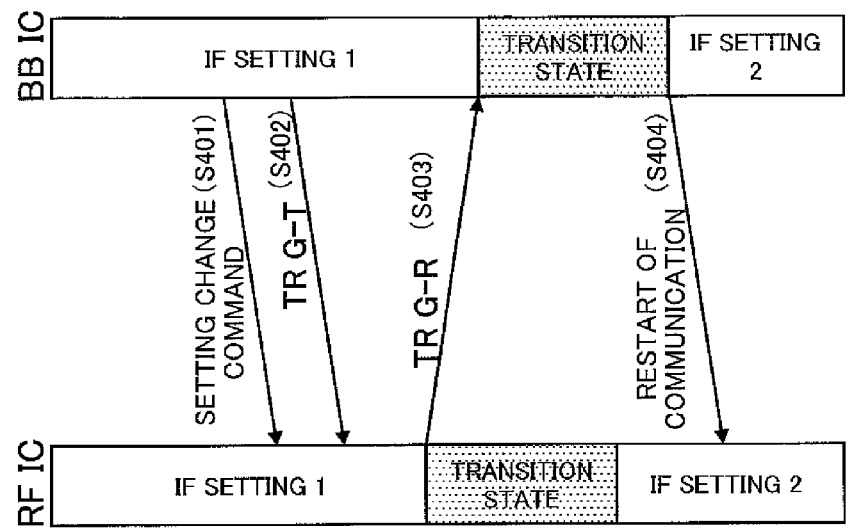
FIG. 4B is a sequence diagram of signals of RF-BB interfaces in DigRFv4 interface.
Figure 4A:
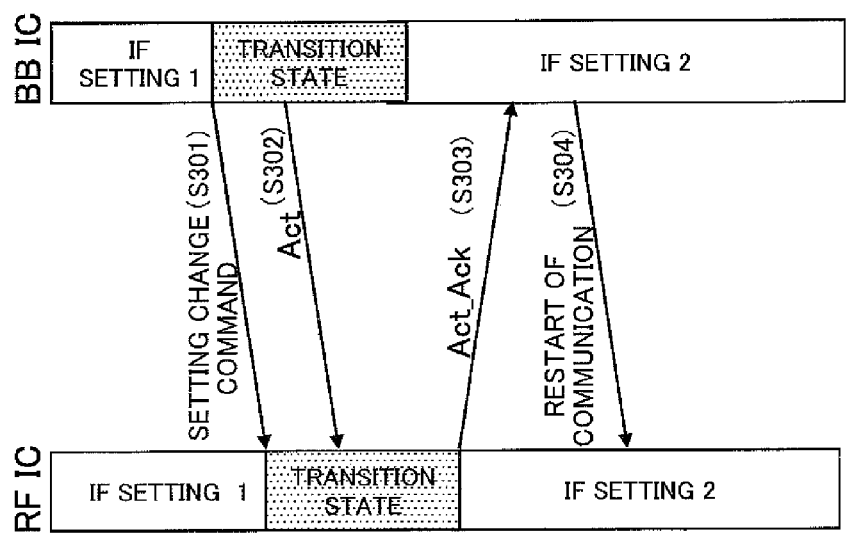
FIG. 4A is a sequence diagram of signals of the RF-BB interfaces in the radio communication device according to the present exemplary embodiment.

The above-described operations of BBIC 10 and RFIC 20 are collectively shown as a sequence of interface signals in FIG. 4A.

Referring to FIG. 4A, when BBIC has sent out to RFIC a setting change command to change from a setting state (IF setting 1) to a new setting state (IF setting 2) (Step 301), BBIC begins to change setting and falls into a transition state. RFIC, upon receipt of the setting change command, similarly begins to change setting and falls into a transition state. Moreover, after beginning to change setting, BBIC transmits a state change trigger signal Act to RFIC (Step 302). Upon receipt of the state change trigger signal Act, RFIC returns a response to it, that is, an acknowledgement signal Act_Ack when the setting change has completed (Step 303). Since BBIC has gone through the transition state to be in the new setting state (IF setting 2) in the meantime, BBIC can immediately restart communication in accordance with IF setting 2 upon receipt of the acknowledgement signal Act_Ack from RFIC (Step 304).

Note that the above-described respective functions of BBIC 10 and RFIC 20 shown in FIGS. 2 and 3 can also be implemented by executing computer programs stored in memory (not shown) on program-controlled processors.

3. Advantageous Effects

According to DigRFv4 interface as shown in FIG. 4B, when BBIC has sent out to RFIC a setting change command to change from a setting state (IF setting 1) to a new setting state (IF setting 2) (Step 401), BBIC subsequently sends out a TRG-T signal (Step 402). Upon receipt of the TRG-T signal, RFIC returns a TRG-R signal to BBIC (Step 403) and begins to change setting to fall into a transition state. Upon receipt of the TRG-R signal, BBIC also begins to change setting to fall into a transition state and, upon completion of the setting change, restarts communication with RFIC (Step 404). As described above, according to the interface shown in FIG. 4B, BBIC cannot begin to change interface setting until a response from RFIC has been received, increasing the time taken from the start of processing until the restart of communication.

On the other hand, according to the present exemplary embodiment, since the state change trigger signal sequence Act-Act_Ack is provided in addition to the serial interfaces for transmitting and receiving commands, it is possible to perform negotiation processing in parallel during the period of the transition state when the interface states are changed in the processing of changing the communication speed of the interface, the number of paths, and the like. When a change is made from low-speed transmission to high-speed transmission in particular, since processing such as waiting for oscillation stabilization of PLL can be performed in parallel, it is possible, as a result, to reduce the time taken from the start of interface setting change processing until the serial interface being ready to restart transmission. In other words, since the state change trigger signal sequence Act-Act_Ack can be performed by the individual respective terminals of the BBIC and RFIC chips, it is possible to have RF-BB negotiation and the transition period in IF setting change overlap each other, reducing the time taken until communication is restarted.

4. Other Modification Examples

It is also possible to use the state change trigger signal Act in the above-described exemplary embodiment in place of an operation start trigger command (what is defined as TAS command in DigRFv4) to start transmission processing or to start reception processing for RFIC. Thereby, it is possible to prevent a delay due to timing competition with other commands transmitted/received through the serial interface, as well as to prevent operation start timings from varying due to retransmission control.

Moreover, it is possible for the controlling side, BBIC, to recognize the operation state on RFIC side by using the acknowledgement signal Act_Ack for a signal to confirm that RFIC has properly processed an operation start command. Since functions related to these operation start triggers are not performed concurrently with interface setting change, it is also possible to provide these functions in combination with the functions according to the present exemplary embodiment.

INDUSTRIAL APPLICABILITY

The present invention is applicable to a serial interface between RFIC and BBIC.

REFERENCE SIGNS LIST

10 Baseband section (BBIC)
20 Radio frequency section (RFIC)
Clk_Req Clock signal request signal
CLK Clock signal
IF_En Interface activation signal
TX_Data Transmission data
RX_Data1, RA_Data2 Reception data
Act State change trigger signal
Act_Ack State change trigger signal acknowledgement signal

The invention claimed is:

1. A radio communication device comprising:
a radio frequency section; and
a baseband section which are connected through a serial interface for exchanging predetermined interface signals,
wherein the serial interface is provided with a dedicated interface state change trigger signal, a dedicated interface state change trigger signal acknowledgement, and the predetermined interface signals,
wherein the dedicated interface state change trigger signal and the dedicated interface state change trigger signal acknowledgement are used for interface state change control,
wherein the baseband section transmits an interface setting change command to the radio frequency section and then starts interface state change processing therein,
wherein upon receiving the interface setting change command, the radio frequency section starts interface state change processing therein,
wherein while the baseband section performs interface state change processing, the baseband section transmits the dedicated interface state change trigger signal to the radio frequency section, and wherein the radio frequency section, upon completing interface state change processing therein, transmits the dedicated interface state change trigger signal acknowledgement to the baseband section as an acknowledgement of receipt of the dedicated interface state change trigger signal.

2. The radio communication device according to claim 1 and the dedicated interface state change trigger signal acknowledgement are independent of transmission speed of the serial interface.

3. The radio communication device according to 1 wherein the baseband section, after receiving the dedicated interface state change trigger signal acknowledgement from the radio frequency section, restarts communication with the radio frequency section in accordance with the changed setting when the interface state change processing of the baseband processor has completed.

4. A state control method for a radio communication device including a radio frequency section and a baseband section which are connected through a serial interface for exchanging predetermined interface signals,
wherein the serial interface is provided with a dedicated interface state change trigger signal, a dedicated interface state change trigger signal acknowledgement, and the predetermined interface signals,
the method comprising:
at the baseband section, transmitting an interface setting change command to the radio frequency section and then starting interface state change processing in the baseband section,
at the radio frequency section, upon receiving the interface setting change command, starting interface state change processing therein,
while the baseband section performs interface state change processing, transmitting by the baseband section to the radio frequency section, the dedicated interface state change trigger signal, and
upon the radio frequency section completing interface state change processing therein, transmitting the dedicated interface state change trigger signal acknowledgement to the baseband section as an acknowledgement of receipt of the dedicated interface state change trigger.

5. The state control method for the radio communication device according to claim 4, wherein the first signal and the second signal are independent of transmission speed of the serial interface.

6. The state control method for the radio communication device according to claim 4, wherein
the baseband section, after receiving the dedicated interface state change trigger signal acknowledgement from the radio frequency section, restarts communication with the radio frequency section in accordance with the changed setting when the interface state change processing of the baseband processor has completed.

7. A control method for a baseband section in a radio communication device in which the baseband section is connected to a radio frequency section through a serial interface for exchanging predetermined interface signal,
wherein the serial interface is provided with a dedicated interface state change trigger signal, a dedicated interface state change trigger signal acknowledgement, and the predetermined interface signals,
the method comprising:
transmitting an interface setting change command to the radio frequency section and then starting interface state change processing therein;

after beginning to change setting of the baseband section, transmitting the dedicated interface state change trigger signal to the radio frequency section; and after receiving the dedicated interface state change trigger signal acknowledgement from the radio frequency section, restarting communication with the radio frequency section in accordance with the changed setting after the change in the setting of the baseband section has completed.

8. A control method for a radio frequency section in a radio communication device in which the radio frequency section is connected to a baseband section through a serial interface for exchanging predetermined interface signals wherein the serial interface is provided with a dedicated interface state change trigger signal, a dedicated interface state change trigger signal acknowledgement, and the predetermined interface signals the method, comprising:

upon receiving an interface setting change command from the baseband section, beginning to change setting of the radio frequency section;

after receiving the dedicated interface state change trigger signal from the baseband section, returning the dedicated interface state change trigger acknowledgement to the baseband section after the change in the setting of the radio frequency section has completed; and restarting communication with the baseband section in accordance with the changed setting.

* * * * *